United States Patent
Yang et al.

(10) Patent No.: US 11,662,879 B2
(45) Date of Patent: May 30, 2023

(54) ELECTRONIC NAMEPLATE DISPLAY METHOD AND APPARATUS IN VIDEO CONFERENCE

(71) Applicant: Huawei Technologies Co., Ltd., Shenzhen (CN)

(72) Inventors: Jing Yang, Dongguan (CN); Zhiwei Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 16/937,065

(22) Filed: Jul. 23, 2020

(65) Prior Publication Data

US 2021/0026517 A1    Jan. 28, 2021

(30) Foreign Application Priority Data

Jul. 24, 2019 (CN) .......................... 201910673037.3

(51) Int. Cl.
  *G06F 3/04817*    (2022.01)
  *G06F 3/01*    (2006.01)
  *G06V 40/16*    (2022.01)

(52) U.S. Cl.
  CPC .......... *G06F 3/04817* (2013.01); *G06F 3/012* (2013.01); *G06V 40/164* (2022.01)

(58) Field of Classification Search
  CPC .. G06F 3/012; G06F 3/04817; G06K 9/00221
  See application file for complete search history.

(56) References Cited

U.S. PATENT DOCUMENTS

| | | | | |
|---|---|---|---|---|
| 5,828,838 A | * | 10/1998 | Downs ................... | H04N 7/152 348/E7.083 |
| 10,109,092 B1 | * | 10/2018 | Hitchings, Jr. ......... | G06T 11/60 |
| 2008/0218582 A1 | * | 9/2008 | Buckler ................... | H04N 7/15 348/E7.083 |
| 2010/0085415 A1 | * | 4/2010 | Rahman ................... | G01S 3/80 348/E7.083 |
| 2012/0287218 A1 | | 11/2012 | Ok | |
| 2012/0313851 A1 | * | 12/2012 | Kasahara ................ | G06F 3/012 345/156 |
| 2013/0144619 A1 | * | 6/2013 | Lord ................... | H04L 12/1822 704/235 |

(Continued)

FOREIGN PATENT DOCUMENTS

| | | |
|---|---|---|
| CN | 207082317 U | 3/2018 |
| WO | 2017193987 A1 | 11/2017 |

OTHER PUBLICATIONS

Rosebrock, A., "OpenCV Face Recognition," Sep. 24, 2018, XP055752173, 41 pages.

(Continued)

*Primary Examiner* — Mong-Shune Chung
(74) *Attorney, Agent, or Firm* — Conley Rose, P.C.

(57) ABSTRACT

An electronic nameplate display method includes obtaining a position of a face of a participant in a video image and identity information of the participant, determining a display position and a size of an electronic nameplate in the video image based on the position of the face in the video image, and displaying the identity information of the participant using the electronic nameplate. In this method, self-adaptive adjustment of the electronic nameplate is implemented based on the position of the face.

19 Claims, 9 Drawing Sheets

(56) References Cited

U.S. PATENT DOCUMENTS

| | | | |
|---|---|---|---|
| 2013/0162752 A1* | 6/2013 | Herz | G06K 9/00221 |
| | | | 348/14.08 |
| 2014/0049595 A1* | 2/2014 | Feng | H04N 5/23299 |
| | | | 348/14.08 |
| 2014/0340467 A1* | 11/2014 | Kajarekar | H04N 7/15 |
| | | | 348/14.08 |
| 2015/0180919 A1* | 6/2015 | Brunson | H04L 65/4046 |
| | | | 709/204 |
| 2015/0189233 A1 | 7/2015 | Carpenter et al. | |
| 2015/0201162 A1* | 7/2015 | Griffin | H04N 7/15 |
| | | | 348/14.07 |
| 2019/0364350 A1* | 11/2019 | Stradley | G06F 1/1698 |
| 2020/0344278 A1* | 10/2020 | Mackell | H04N 7/147 |

OTHER PUBLICATIONS

Bell, B., et al., "View management for Virtual and Augmented Reality," Nov. 11, 2001, pp. 101-110, XP058388206.

\* cited by examiner

ELECTRONIC NAMEPLATE DISPLAY METHOD AND APPARATUS IN VIDEO CONFERENCE

CROSS-REFERENCE TO RELATED APPLICATIONS

This application claims priority to Chinese Patent Application No. 201910673037.3, filed on Jul. 24, 2019, which is hereby incorporated by reference in its entirety.

TECHNICAL FIELD

This application relates to the field of artificial intelligence and an intelligent terminal, and in particular, to an electronic nameplate display method and apparatus in a video conference.

BACKGROUND

With the continuous development of the internet and communications technologies, time and region no longer hinder to human communication. Human communication methods are increasingly diversified, and "face-to-face" communication has become indispensable for people in daily life. With the expansion of enterprise services and the rapid development of the information era, more enterprises choose remote video conferences for real-time communication. This reduces travel expenses, saves time, and improves conference quality and work efficiency.

As application scenarios of the video conference are increasing, the video conference is no longer a single-region conference, but a multi-party conference. In the multi-party conference, most people may not know each other in advance, and cannot remember another person's name for a while and cannot call his/her name. As a result, an awkward atmosphere of "stranger" is generated, and even an important speech of a leader is missed, resulting in low conference efficiency. Therefore, conference staff put a paper nameplate of a participant on a table in advance such that everyone can take a seat. However, the paper nameplate does not facilitate recycling, and is wasteful and not environment-friendly. Then, a light-emitting diode (LED) desktop electronic nameplate appears. Although a waste of paper is reduced, the LED desktop electronic nameplate is costly and inconvenient to carry.

Therefore, an electronic nameplate display method and apparatus in the video conference is urgently needed, to reduce a waste of resources and conveniently learn identity information of the participant.

SUMMARY

In view of this, embodiments of this application provide an electronic nameplate display method and apparatus in a video conference, to implement self-adaptive adjustment for displaying of an electronic nameplate of a participant in a different conference scenario.

According to a first aspect, an embodiment of this application provides an electronic nameplate display method in a video conference. The method includes obtaining a position of a face of a participant in a video image and identity information of the participant, determining a display position and a size of an electronic nameplate in the video image based on the position of the face in the video image, and displaying the identity information using the electronic nameplate.

With reference to the implementation of the first aspect, in a first possible implementation of the first aspect, the determining a display position and a size of an electronic nameplate in the video image based on the position of the face in the video image includes determining a distribution status of the face based on the position of the face in the video image, and determining the display position and the size of the electronic nameplate in the video image based on the position of the face in the video image and the distribution status of the face.

With reference to the first aspect or the first possible implementation of the first aspect, in a second possible implementation of the first aspect, the method further includes configuring a color of the electronic nameplate, transparency of the electronic nameplate, a contour form of the electronic nameplate, a font of a character or a symbol in the electronic nameplate, and a color of a character or a symbol in the electronic nameplate.

With reference to the first aspect or the first and the second possible implementations of the first aspect, in a third possible implementation of the first aspect, the method further includes obtaining an input message, where the input message is used to indicate a display requirement of a user on the electronic nameplate, and the input message includes manual input by the user and/or voice input by the user.

With reference to the first aspect or the first to the third possible implementations of the first aspect, in a fourth possible implementation of the first aspect, the method further includes obtaining a skin tone and/or a dress color of the participant, and configuring the color of the electronic nameplate and/or the transparency of the electronic nameplate based on the skin tone and/or the dress color of the participant.

With reference to the first aspect or the first to the fourth possible implementations of the first aspect, in a fifth possible implementation of the first aspect, after the displaying the identity information using the electronic nameplate, the method further includes, when it is detected that the electronic nameplate overlaps a face area of the participant or another electronic nameplate, displaying the electronic nameplate and/or the other electronic nameplate at a new position.

With reference to the first aspect or the first to the fifth possible implementations of the first aspect, in a sixth possible implementation of the first aspect, the electronic nameplate is connected to the face area of the participant corresponding to the electronic nameplate using a straight line or an arrow.

With reference to the first aspect or the first to the sixth possible implementations of the first aspect, in a seventh possible implementation of the first aspect, after the displaying the identity information using the electronic nameplate, the method further includes, when it is detected that speech duration of at least one first participant in the participant is greater than first preset duration or less than second preset duration, replacing an electronic nameplate corresponding to the at least one first participant with at least one new electronic nameplate.

With reference to the first aspect or the first to the seventh possible implementations of the first aspect, in an eighth possible implementation of the first aspect, after the displaying the identity information using the electronic nameplate, the method further includes, when it is detected that speech duration of a second participant in the participant in third preset duration is less than fourth preset duration, where the third preset duration is greater than the fourth preset duration, canceling displaying of an electronic nameplate corresponding to the second participant.

With reference to the first aspect or the first to the eighth possible implementations of the first aspect, in a ninth possible implementation of the first aspect, after the displaying the identity information using the electronic nameplate, the method further includes starting a timer, and when the timer reaches a preset time point, determining, based on an input audio stream, at least one third participant in the participant corresponding to the input audio stream, and determining whether an electronic nameplate corresponding to the third participant is in a display state, and when the electronic nameplate corresponding to the third participant is not in the display state, displaying the electronic nameplate corresponding to the third participant.

With reference to the first aspect or the first to the ninth possible implementations of the first aspect, in a tenth possible implementation of the first aspect, after the determining whether an electronic nameplate corresponding to the third participant is in a display state, the method further includes canceling displaying of an electronic nameplate corresponding to another participant, where the other participant is a participant that is not the third participant.

With reference to the first aspect or the first to the tenth possible implementations of the first aspect, in an eleventh possible implementation of the first aspect, after the determining whether an electronic nameplate corresponding to the third participant is in a display state, the method further includes restarting, by the timer, timing on the third participant.

With reference to the first aspect or the first to the eleventh possible implementations of the first aspect, in a twelfth possible implementation of the first aspect, after the determining whether an electronic nameplate corresponding to the third participant is in a display state, the method further includes, when it is detected that a fourth participant in the other participants speaks, displaying an electronic nameplate corresponding to the fourth participant.

With reference to the first aspect or the first to the twelfth possible implementations of the first aspect, in a thirteenth possible implementation of the first aspect, the identity information includes one or more of the following information a name, an age, contact information, a place of origin, a working company, a position, and an education background.

According to a second aspect, an embodiment of this application further provides an electronic nameplate display apparatus in a video conference. The apparatus includes an obtaining module, a configuration module, and a display module, where the obtaining module is configured to obtain a position of a face of a participant in a video image and identity information of the participant, the configuration module is further configured to determine a display position and a size of an electronic nameplate in the video image based on the position of the face in the video image, and the display module is configured to display the identity information using the electronic nameplate.

With reference to the implementation of the second aspect, in a first possible implementation of the second aspect, that the configuration module determines a display position and a size of an electronic nameplate in the video image based on the position of the face in the video image includes determining a distribution status of the face based on the position of the face in the video image, and determining the display position and the size of the electronic nameplate in the video image based on the position of the face in the video image and the distribution status of the face.

With reference to the second aspect or the first possible implementation of the second aspect, in a second possible implementation of the second aspect, the configuration module is further configured to configure a color of the electronic nameplate, transparency of the electronic nameplate, a contour form of the electronic nameplate, a font of a character or a symbol in the electronic nameplate, and a color of a character or a symbol in the electronic nameplate.

With reference to the second aspect or the first and the second possible implementations of the second aspect, in a third possible implementation of the second aspect, the obtaining module is further configured to obtain an input message, where the input message is used to indicate a display requirement of a user on the electronic nameplate, and the input message includes manual input by the user and/or voice input by the user.

With reference to the second aspect or the first to the third possible implementations of the second aspect, in a fourth possible implementation of the second aspect, the obtaining module is further configured to obtain a skin tone and/or a dress color of the participant, and determine the color and/or the transparency of the electronic nameplate based on the skin tone and/or the dress color of the participant.

With reference to the second aspect or the first to the fourth possible implementations of the second aspect, in a fifth possible implementation of the second aspect, the apparatus further includes a first detection module, where the first detection module is configured to detect whether the electronic nameplate overlaps a face area of the participant or another electronic nameplate, and when the first detection module detects that the electronic nameplate overlaps the face area of the participant or the other electronic nameplate, the display module displays the electronic nameplate or the other electronic nameplate at a new position.

With reference to the second aspect or the first to the fifth possible implementations of the second aspect, in a sixth possible implementation of the second aspect, the electronic nameplate is connected to the face area of the participant corresponding to the electronic nameplate using a straight line or an arrow.

With reference to the second aspect or the first to the sixth possible implementations of the second aspect, in a seventh possible implementation of the second aspect, the apparatus further includes a second detection module, where the second detection module is configured to detect whether speech duration of at least one first participant in the participant is greater than first preset duration or less than second preset duration, and when the second detection module detects that the speech duration of the at least one first participant in the participant is greater than the first preset duration or less than the second preset duration, the display module replaces an electronic nameplate corresponding to the at least one first participant with a new electronic nameplate.

With reference to the second aspect or the first to the seventh possible implementations of the second aspect, in an eighth possible implementation of the second aspect, the second detection module is further configured to detect whether speech duration of a second participant in the participant in third preset duration is less than fourth preset duration, where the third preset duration is greater than the fourth preset duration, and when the second detection module detects that the speech duration of the second participant in the participant in the third preset duration is less than the fourth preset duration, where the third preset duration is greater than the fourth preset duration, the display module cancels displaying of an electronic nameplate corresponding to the second participant in the video image.

With reference to the second aspect or the first to the eighth possible implementations of the second aspect, in a ninth possible implementation of the second aspect, the apparatus further includes a timing module and an audio detection module, where the timing module is configured to perform timing on the participant, the audio detection module is configured to, when timing of the timing module reaches a preset time point, detect at least one third participant in the participant corresponding to an input audio stream, and the display module is further configured to determine whether an electronic nameplate corresponding to the third participant is in a display state, and when the electronic nameplate corresponding to the third participant is not in the display state, the display module displays the electronic nameplate corresponding to the third participant.

With reference to the second aspect or the first to the ninth possible implementations of the second aspect, in a tenth possible implementation of the second aspect, the display module is further configured to cancel displaying of an electronic nameplate corresponding to another participant, where the other participant is a participant that is not the third participant.

With reference to the second aspect or the first to the tenth possible implementations of the second aspect, in an eleventh possible implementation of the second aspect, the timing module is further configured to perform timing on the third participant again.

With reference to the second aspect or the first to the eleventh possible implementations of the second aspect, in a twelfth possible implementation of the second aspect, the audio detection module is further configured to detect whether a fourth participant in the other participants speaks, and when the audio detection module detects that the fourth participant in the other participants speaks, the display module displays an electronic nameplate corresponding to the fourth participant.

According to a third aspect, an embodiment of this application further provides a timing display method in a video conference. The method includes starting a timer, and when the timer reaches a preset time point, determining, based on an input audio stream, whether a first participant in the participant speaks, where the input audio stream is an audio stream input in a time period from a time point when the timer starts timing to the preset time point, and displaying an electronic nameplate corresponding to the first participant, and canceling displaying of an electronic nameplate corresponding to another participant, where the other participant is a participant that is not the first participant.

With reference to the implementation of the third aspect, in a first possible implementation of the third aspect, timing is restarted on the first participant, and in this case, timing may not be performed on the other participant.

With reference to the third aspect or the first possible implementation of the third aspect, in a second possible implementation of the third aspect, when it is detected that a second participant in the other participants speaks, an electronic nameplate corresponding to the second participant is displayed. Once it is detected that the second participant in the other participants speaks, the electronic nameplate of the second participant is immediately displayed, and timing may be performed on the second participant again.

According to the electronic nameplate timing display method in the video conference provided in this embodiment of this application, displaying of the electronic nameplate of the participant is controlled by detecting whether the participant speaks and by performing timing on the speech duration of the participant. Canceling displaying of the electronic nameplate that is not required can reduce a waste of resources, and especially in a complex environment, can prevent the electronic nameplate from occupying too large video image.

According to a fourth aspect, an embodiment of this application further provides an electronic nameplate display device. The device includes a memory, one or more processors, a transceiver, a display screen, and a camera, where the memory is configured to store a program instruction, the camera is configured to obtain a video image of a participant, the transceiver is configured to obtain identity information of the participant, the processor is configured to execute the program instruction to execute obtaining a position of a face of the participant in the video image and determining a display position and a size of an electronic nameplate in the video image based on the position of the face in the video image, and the display screen is configured to display the identity information using the electronic nameplate.

With reference to the implementation of the fourth aspect, in a first possible implementation of the fourth aspect, that the processor determines a display position and a size of an electronic nameplate in the video image based on the position of the face in the video image includes determining, by the processor, a distribution status of the face based on the position of the face in the video image, and determining, by the processor, the display position and the size of the electronic nameplate in the video image based on the position of the face in the video image and the distribution status of the face.

With reference to the fourth aspect or the first possible implementation of the fourth aspect, in a second possible implementation of the fourth aspect, the processor is further configured to configure a color of the electronic nameplate, transparency of the electronic nameplate, a contour form of the electronic nameplate, a font of a character or a symbol in the electronic nameplate, and a color of a character or a symbol in the electronic nameplate.

With reference to the fourth aspect or the first and the second possible implementations of the fourth aspect, in a third possible implementation of the first aspect, the transceiver is further configured to receive an input message, where the input message is used to indicate a display requirement of a user on the electronic nameplate, and the input message includes manual input by the user and/or voice input by the user.

With reference to the fourth aspect or the first to the third possible implementations of the fourth aspect, in a fourth possible implementation of the fourth aspect, the processor is further configured to obtain a skin tone and/or a dress color of the participant in the video image, and determine the color and/or the transparency of the electronic nameplate based on the skin tone and/or the dress color of the participant.

With reference to the fourth aspect or the first to the fourth possible implementations of the fourth aspect, in a fifth possible implementation of the fourth aspect, the processor is further configured to determine whether the electronic nameplate overlaps a face area of the participant or another electronic nameplate, and when the processor determines that the electronic nameplate overlaps the face area of the participant or the other electronic nameplate, the processor determines a new display position and a new size of the electronic nameplate or the other electronic nameplate.

With reference to the fourth aspect or the first to the fifth possible implementations of the fourth aspect, in a sixth possible implementation of the fourth aspect, the device further includes a timer and a microphone, where the timer is configured to perform timing on the participant, the microphone is configured to collect an audio stream input within a preset time period, the processor is further configured to determine at least one first participant in the participant corresponding to the input audio stream, and the display screen is further configured to determine whether an electronic nameplate corresponding to the first participant is in a display state, and when the electronic nameplate corresponding to the first participant is not in the display state, the display screen displays the electronic nameplate corresponding to the first participant.

With reference to the fourth aspect or the first to the sixth possible implementations of the fourth aspect, in a seventh possible implementation of the fourth aspect, the timer is further configured to perform timing on speech duration of the participant, and the processor determines whether speech duration of a participant in the participant is greater than first preset duration or less than second preset duration, and when the processor determines that speech duration of a second participant in the participant is greater than the first preset duration or less than the second preset duration, the processor determines a new electronic nameplate corresponding to the second participant, and the display screen replaces an electronic nameplate corresponding to the second participant with the new electronic nameplate for displaying.

With reference to the fourth aspect or the first to the seventh possible implementations of the fourth aspect, in an eighth possible implementation of the fourth aspect, when the processor determines that the speech duration of the second participant is less than the second preset duration, the display screen cancels displaying of the electronic nameplate corresponding to the second participant.

According to a fifth aspect, this application provides a readable storage medium. The readable storage medium stores an execution instruction, and when at least one processor of a packet processing device executes the execution instruction, the electronic nameplate display device performs the method performed by the processor or the transceiver in any one of the fourth aspect or the possible implementations of the fourth aspect.

According to a sixth aspect, this application provides a program product. The program product includes an execution instruction, and the execution instruction is stored in a readable storage medium. At least one processor of the electronic nameplate display device may read the execution instruction from the readable storage medium, and the at least one processor executes the execution instruction such that the electronic nameplate display device implements the method performed by the processor or the transceiver in any one of the fourth aspect or the possible implementations of the fourth aspect.

BRIEF DESCRIPTION OF DRAWINGS

To describe the technical solutions in the embodiments of this application or in other approaches more clearly, the following briefly describes the accompanying drawings required for describing the background and the embodiments. Apparently, the accompanying drawings in the following description show merely some embodiments of this application, and a person of ordinary skill in the art may still derive other accompanying drawings or embodiments according to these drawings or description without creative efforts, and the application is intended to cover all these derived accompanying drawings or embodiments.

DESCRIPTION OF EMBODIMENTS

The device form and the service scenario described in the embodiments of this application are intended to describe technical solutions of the embodiments of the present disclosure more clearly, and do not constitute a limitation on the technical solutions provided in the embodiments of the present disclosure. A person of ordinary skill in the art may learn that, with evolution of a device form and emergence of a new service scenario, the technical solutions provided in the embodiments of this application are also applicable to similar technical problems.

Figure 1:
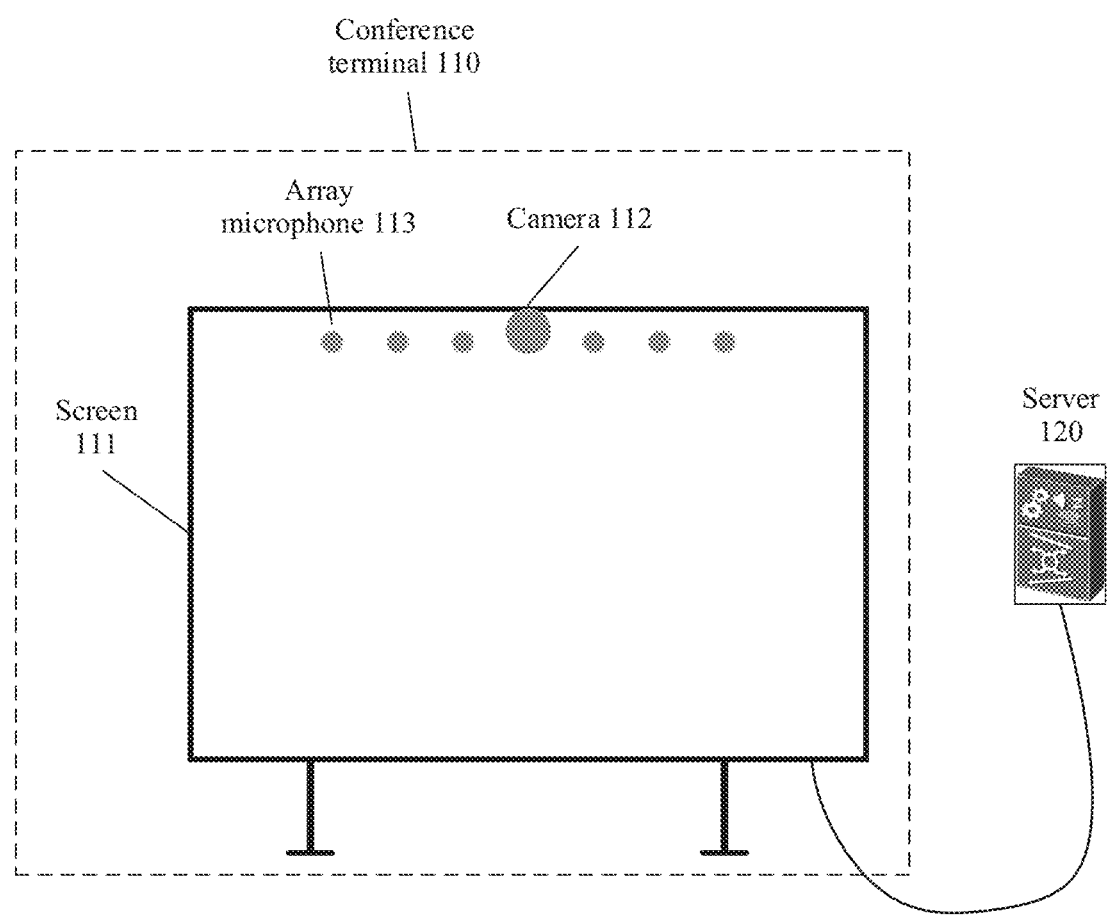
FIG. 1 is a schematic diagram of a conference apparatus in a video conference according to an embodiment of this application.

An embodiment of this application provides a conference apparatus in a video conference. As shown in FIG. 1, the conference apparatus includes a conference terminal 110 and a server 120. The conference apparatus may be applied to a plurality of remote conference rooms, one conference terminal is placed in each conference room, and a plurality of conference rooms may share a server or is separately configured with a server. The conference apparatus may enable participants in the plurality of conference rooms to be more quickly and conveniently familiar with each other.

The conference terminal 110 includes a screen 111, a camera 112, and an array microphone 113. The camera 112 is configured to capture an image at a conference site and perform face recognition, the screen 111 is configured to display, and the array microphone 113 is configured to play a voice or collect an audio input at the site. The server 120 includes a cloud end and an offline end, and is configured to store face feature information and identity information of the participant. A participant is recognized in an image collected by the camera 112 based on the face feature information, and identity information of the participant is found in the server 120. The identity information of the participant is superimposed on a video image currently displayed in the video conference using a subtitle superimposition apparatus of the video conference, and then the video image is decoded in real time and displayed on the screen 111 of the video conference. An electronic nameplate mentioned in this embodiment of this application may be a nameplate of the participant displayed on the screen 111 through superimposition using the subtitle superimposition apparatus.

It may be figured out that, in this embodiment, face feature information, of a to-be-recognized participant, obtained based on currently displayed video image information may further include an iris and an eye print of the face. When the face feature information includes the iris or the eye print, the iris or the eye print may be collected using the camera of the video conference. Identity information of the to-be-recognized participant may be determined provided that the iris or the eye print of the to-be-recognized participant is compared with an iris or an eye print of a preset participant. However, due to a limitation of other approaches, iris or eye print recognition not only requires dedicated recognition software, but also requires cooperation of the participant moving eyes close to the camera. This not only increases recognition costs, but also brings inconvenience to the participant. Therefore, in this embodiment, a preferred manner is to use a face recognition technology to recognize the face feature information of the participant in the currently displayed video image information.

In addition, the identity information mentioned in the embodiments of this application includes but is not limited to a name, an age, contact information, a place of origin, a working company, a position, and an education background of the participant.

It should be noted that the terms "first", "second", and the like in this application are used to distinguish between similar objects but do not necessarily indicate a specific order or sequence. It should be understood that the data termed in such a way is interchangeable in proper cases such that the embodiments described herein can be implemented in orders not described in this application. The term "and/or" is used to describe an association relationship between associated objects, and indicates that three relationships may exist. For example, A and/or B may represent the following cases. Only A exists, both A and B exist, and only B exists. A specific operation method in method embodiments may also be applied to apparatus embodiments. In addition, to more clearly reflect a relationship between components in different embodiments, in this application, a same reference numeral is used to represent components with a same function or similar functions in different embodiments.

It should be further noted that, unless otherwise specified, specific descriptions for some technical features in one embodiment may further be used to explain corresponding technical features mentioned in other embodiments. For example, a design example of face information or identity information of a participant in one embodiment may be applicable to face information in all other embodiments.

Figure 2:
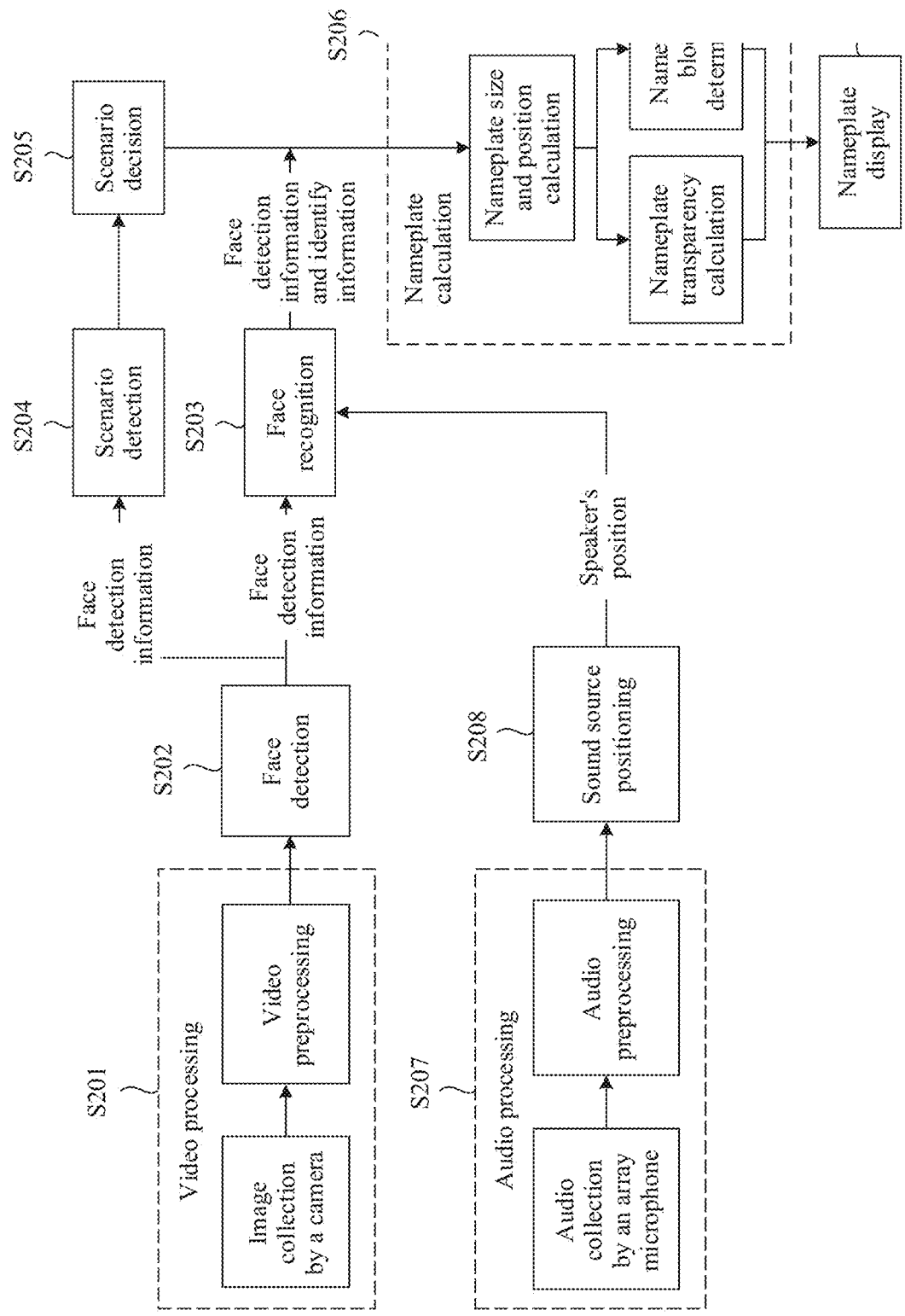
FIG. 2 is a flowchart of displaying an electronic nameplate in a video conference according to an embodiment of this application.

FIG. 2 is a flowchart of displaying an electronic nameplate in a video conference according to an embodiment of this application. As shown in FIG. 2, a process of displaying the electronic nameplate in the video conference includes the following steps.

S201. Video processing.

A camera collects an image to obtain a video stream for video preprocessing, where the video preprocessing includes operations such as image collection, noise reduction, polar line correction, and resolution and frame rate change, and then the camera outputs a video-preprocessed video stream for subsequent face detection S202.

S202. Face detection.

An input of the face detection is the video-preprocessed video image. Face detection information may be obtained through the face detection on the video image. The face detection information includes a position or coordinates of a face in the video image, a face size, and the like. A face size of a participant may be calculated based on face coordinates of the participant. Further, the face detection information may further include a skin tone of the face, a dress color, and the like.

S203. Face recognition.

During the face recognition, a face image obtained in the step S202 is received, and the face image is sent to a server. The server extracts face feature information from the face image to perform the face recognition.

S204. Scenario detection.

An input of the scenario detection is the face detection information, and scenario information is obtained by detecting a distribution status of persons or faces based on position or coordinate information in the face detection information. For example, when face centers of most participants are on a same straight line, it may be determined that the participants sit in a row, or when faces of the participants are symmetrically distributed to the left and right, it can be determined that the participants sit around. In an embodiment, a certain error range may be set, and it may be considered that approximately being on a straight line or approximately symmetrically being distributed on the left and right in the error range belongs to the foregoing case.

S205. Scenario decision.

An input of the scenario decision is the scenario information, and obtained scenario decision information is provided for nameplate calculation in S206. To make a display effect of the electronic nameplate of the participant more pleasing and intuitive, special processing may be performed in some special scenarios, which generally include the following several cases, when detected scenario information is that the participants sit in a row, the electronic nameplates are distributed in a straight line below the faces, when detected scenario information is that the participants sit around a table, displaying of the electronic nameplates includes but is not limited to displaying near the faces in a left-right symmetrical arrangement manner toward two sides, or when detected scenario information is a close-up image of a participant, only a nameplate of the close-up participant is displayed. When the detected scenario information has no rules, the electronic nameplate is generally placed below the face.

S206. Nameplate calculation.

2061. Nameplate position and size calculation.

The nameplate position and size are calculated based on the position or the coordinate information of the received face detection information and the scenario decision information.

Figure 3A:
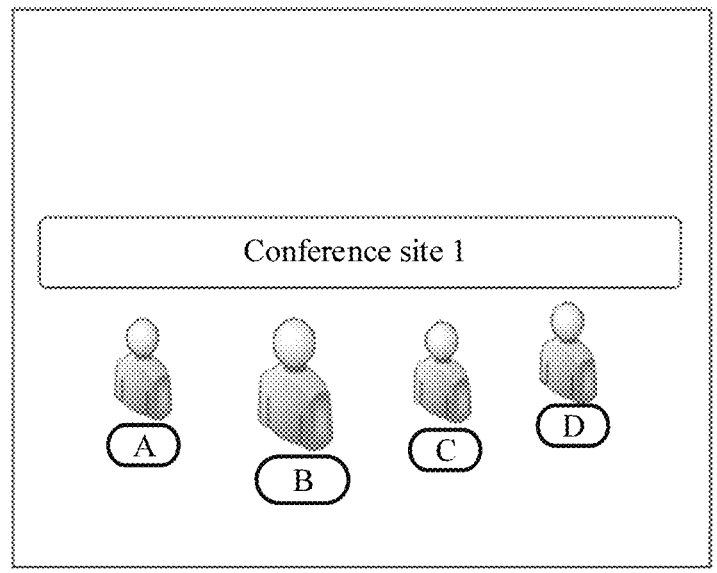
FIG. 3A and FIG. 3B are schematic diagrams of a scenario in which an electronic nameplate is displayed in a video conference according to an embodiment of this application.

When it is decided in the scenario decision that the electronic nameplates of the participants are determined according to a general design rule or no scenario decision information is received, the electronic nameplate is set, according to a face position, to a fixed area that is below a face of each participant and that is within a specific distance from the face, and the size of the electronic nameplate is adjusted according to a size of a face area. As shown in FIG. 3A, a face area of participant B is larger, and therefore an electronic nameplate of participant B is also larger. Because the electronic nameplate is set in the fixed area at the distance below the face, electronic nameplates of all participants in FIG. 3A are also uneven.

Figure 3B:
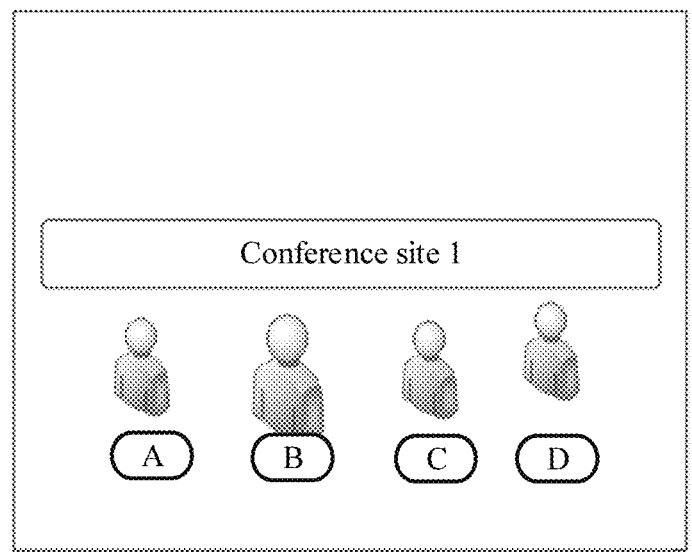

When it is decided in the scenario decision that the electronic nameplates of the participants need to be displayed in a row, as shown in FIG. 3B, the electronic nameplates of the participants are set in a straight line by comprehensively considering the position and the size of the face, and it is ensured that the electronic nameplates of the participants are of a same height.

Figure 4A:
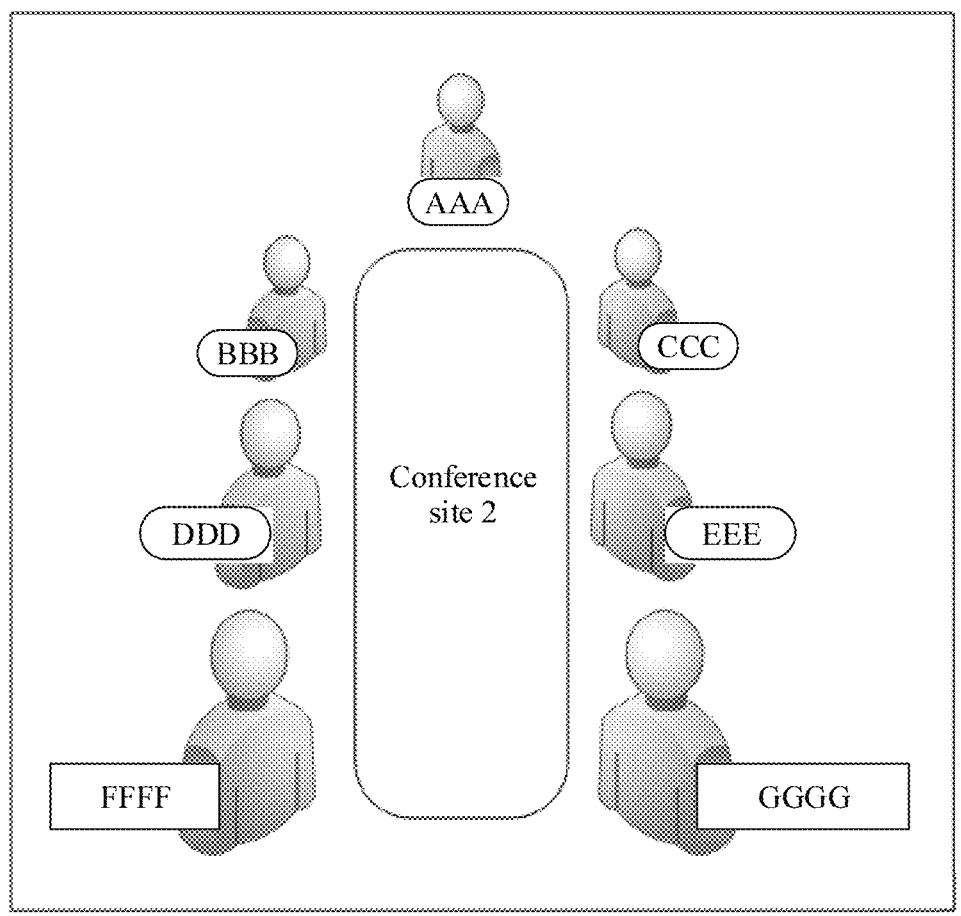
FIG. 4A and FIG. 4B are schematic diagrams of a scenario in which an electronic nameplate is displayed in a video conference according to an embodiment of this application.

When it is decided in the scenario decision that the electronic nameplates of the participants need to be displayed near the face in a left-right symmetrical arrangement manner, as shown in FIG. 4A, in this case, the electronic nameplates may be symmetrically set by comprehensively considering coordinates of the face position, and the size of the electronic nameplate is adjusted according to the size of the face area.

When it is decided in the scenario decision that the electronic nameplate of the close-up participant is displayed, an electronic nameplate of another participant is canceled for displaying.

2062. Nameplate Block Determining.

Figure 4B:
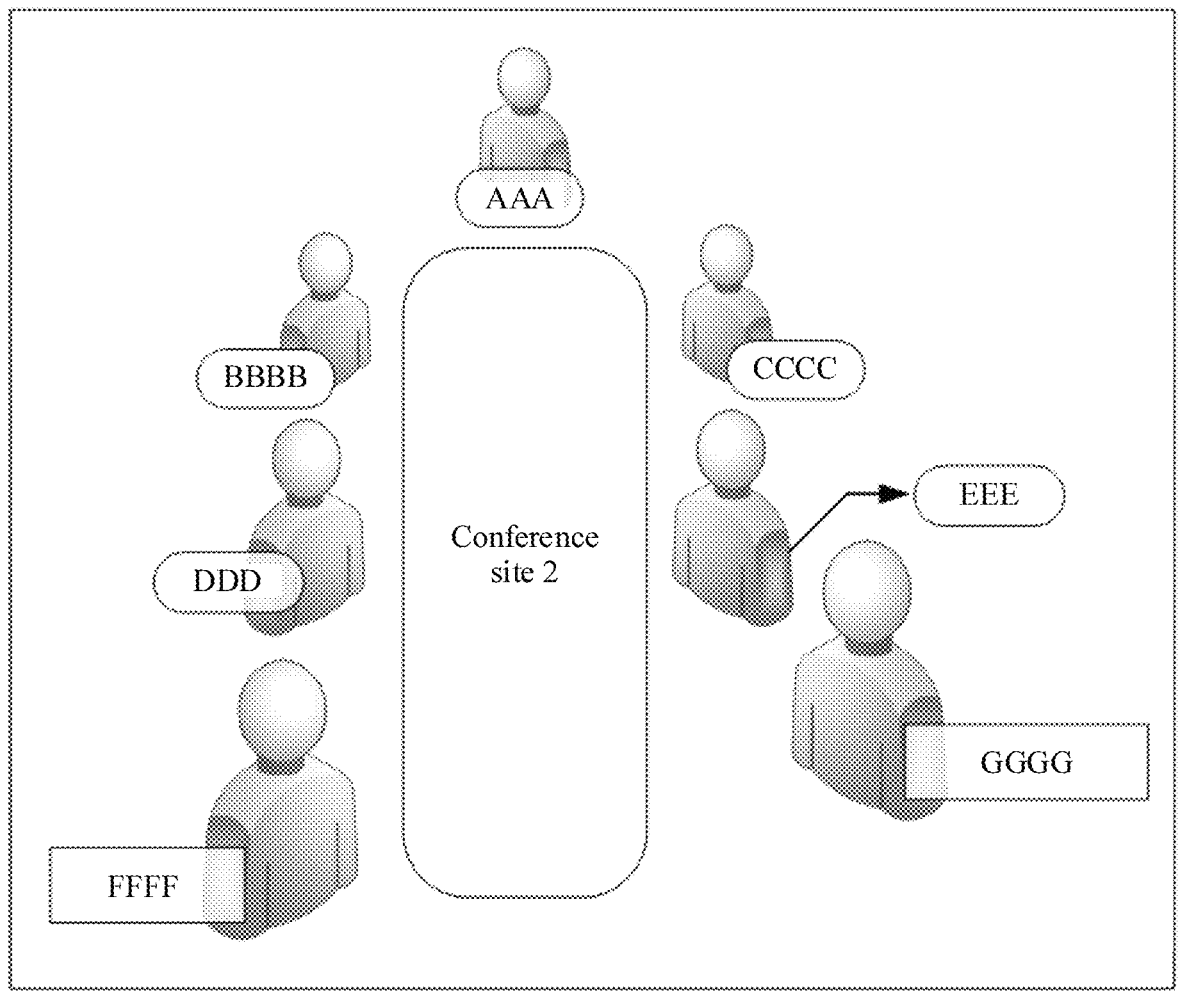

Calculation is performed based on the position or the coordinate information in the received face detection information and the position and size information of the electronic nameplate, to determine whether the nameplate of the participant overlaps a face of another participant or an electronic nameplate of another participant. when it is detected that the nameplate of the participant overlaps the face of the other participant or the electronic nameplate of the other participant, for example, due to walking around of a person, the person is too close to another person at the conference, an overlapping electronic nameplate may be recalculated to display at a new position and in a new size. As shown in FIG. 4B, due to walking around of a participant G, a face area of the participant G overlaps an electronic nameplate of a participant E, in this case, the electronic nameplate of the participant E is moved to a new position for displaying. The position that has been moved may be far away from the participant E. To facilitate visualization, an arrow can be used to guide.

2063. Nameplate Transparency Calculation.

The transparency of the nameplate is calculated based on skin tone and dress color information in the face detection information. The color of the electronic nameplate may use a color gradient, including but not limited to deep-to-shallow progression, and the transparency of the nameplate is automatically adjusted through a dress color depth.

S207. Video processing.

An array microphone collects and obtains an audio stream for audio preprocessing, and performs 3A processing on a plurality of channels of input audio data. A processing manner of Acoustic Echo Cancelation (AEC), automatic gain control (AGC), and active noise control (ANC), also called noise cancellation or noise suppression) is commonly known as 3A processing.

S208. Sound source positioning.

Speaker's position information is found based on the processed audio stream, for subsequent face detection information matching such that a participant who is speaking can be determined.

S209. Nameplate display.

According to the calculated position, size, and identity information of the electronic nameplate, the identity information is added to the electronic nameplate, and then the electronic nameplate is superimposed on the image to generate an image with the nameplate, and then the image with the nameplate is displayed on the screen.

Figure 5:
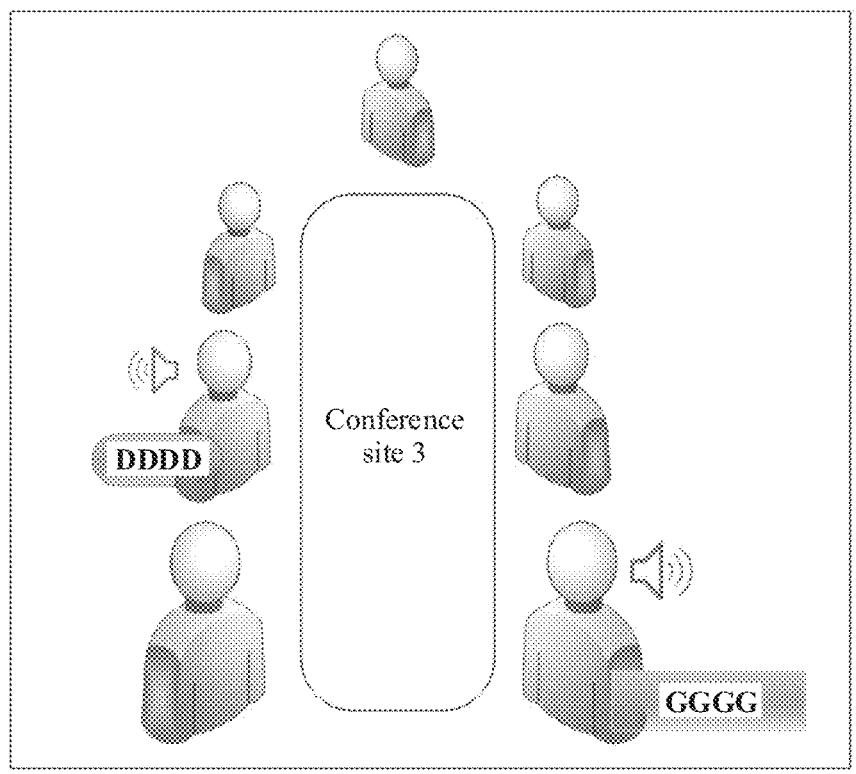
FIG. 5 is a schematic diagram of a scenario in which an electronic nameplate is displayed in a video conference according to an embodiment of this application.

Optionally, the electronic nameplate of the speaker that is determined in S208 and that is speaking may be highlighted, and a highlighting manner includes a bold font, changing a color of a font, or changing a form of an outline of the electronic nameplate, to distinguish the speaker from a participant that is not speaking. This improves attention of the participant and avoids missing an important speech. Further, an electronic nameplate of the participant that is not speaking may be canceled for displaying, or a display style of an electronic nameplate of the participant that is not speaking may be changed. The display style of the electronic nameplate includes brightness, color, outline form, transparency, and font and color of a character or a symbol in the electronic nameplate. As shown in FIG. 5, when a participant D and a participant G are speaking or frequently speaking, electronic nameplates of the participant D and the participant G are highlighted, and an electronic nameplate of another participant is canceled for displaying.

Optionally, timing is performed on the participant. when a participant does not speak within preset duration or speech duration is less than another preset duration, an electronic nameplate of the participant may be canceled for displaying, a display style of the electronic nameplate may be changed, or the like.

The participant or a user may further send an instruction using a voice assistant. The voice assistant performs voice recognition on an input voice, and converts the input voice to obtain an intention instruction of the user. The intention instruction includes an instruction for displaying/canceling an electronic nameplate, displaying the identity information of the participant, changing the display style of the electronic nameplate, and the like. For example, when the user requires "displaying a name and an employee identifier (ID) of a third person on a left side at a conference site 2", the voice assistant recognizes that the user intends to display the name and the employee ID of the person, and the person is a third face on the left side at the conference site 2. The user requires "canceling a nameplate of a largest face at a conference site 2", and the voice assistant recognizes that the user intends to cancel the nameplate, and the nameplate is a nameplate corresponding to the largest face at the conference site 2.

Embodiments of this application provide a conference terminal and the electronic nameplate display method in the video conference. Self-adaptive adjustment for displaying of the electronic nameplate of the participant can be implemented in a different conference scenario, and the electronic nameplate can be displayed in a more intuitive manner. This improves conference efficiency and resolves problems of single display, low differentiation, and not user-friendly of the current electronic nameplate.

Figure 6:
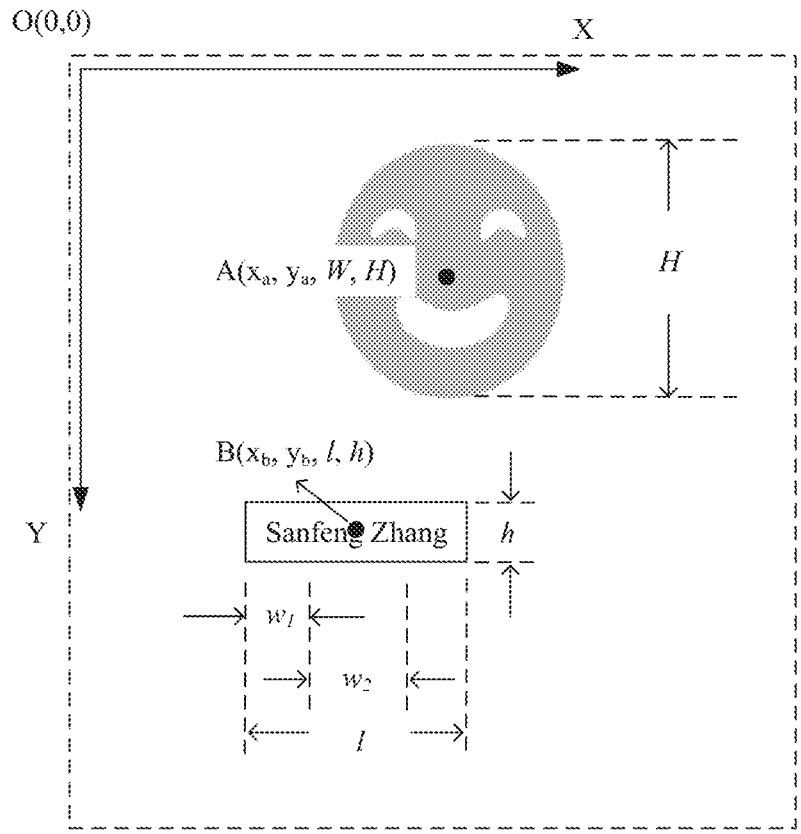
FIG. 6 is a schematic diagram of a method for determining an electronic nameplate position according to an embodiment of this application.

FIG. 6 is a schematic diagram of a method for determining an electronic nameplate position according to an embodiment of this application. As shown in FIG. 6, in the method, a coordinate system XOY is established in an upper left corner of a video image, and points A and B are respectively geometric centers of a face and an electronic nameplate. The following table 1 describes a physical meaning of each parameter.

TABLE 1

Parameters and corresponding physical meanings

| Parameter | Physical meaning |
|---|---|
| $x_a$ | Horizontal coordinate of point A (a geometric center of a face) |
| $y_a$ | Vertical coordinate of point A (a geometric center of a face) |
| W | Face width |
| H | Face height |
| $x_b$ | Horizontal coordinate of point B (a geometric center of an electronic nameplate) |
| $y_b$ | Vertical coordinate of point B (a geometric center of an electronic nameplate) |
| l | Electronic nameplate width |
| h | Electronic nameplate height |
| $w_1$ | Electronic nameplate reserved length |
| $w_2$ | Identity information display width |
| $h_2$ | Identity information display height |

A ($x_a$, $y_a$, W, H) is obtained through face detection, and then $w_1$, $w_2$, and $h_2$, and $w_1$, $w_2$, and $h_2$ are determined according to information such as a name of a participant that needs to be displayed and a face size of the participant. For example, a name of a participant to be displayed is "Sanfeng Zhang", a face size obtained through face detection calculation is 100 square centimeters, and a character size corresponding to "Sanfeng Zhang" may be obtained according to a preset comparison table of a preset face size, a preset character or symbol size, and a reserved length of an electronic nameplate, and therefore $w_1$, $w_2$, and $h_2$ corresponding to "Sanfeng Zhang" can be determined. In an embodiment, rules for setting a size and model of the character or symbol in Chinese and English or other languages may be different. In addition, it should be noted that $w_2$ and $h_2$ are respectively corresponding to display width and display height of the identity information. Not only a name but also other information may be included. The reserved length $w_1$ of the electronic nameplate is a length of blank semitransparent space next to the identity information such that the electronic nameplate is displayed more pleasingly and intuitively.

Then, a geometric center B ($x_b$, $y_b$, l, h) of the electronic nameplate is calculated according to the following calculation rules $$l = w_2 + 2w_1$$

$$h = h_2$$

$$x_b = x_a - c_1 * l$$

$$y_b = y_a + c_2 * H$$

where $c_1$ and $c_2$ are constants, and may be adjusted according to an actual situation. Preferably, $c_1 = 0.5$ and $c_2 = 1$.

Geometric centers B1, B2, and the like of electronic nameplates corresponding to other faces may also be obtained according to the foregoing method, and whether there is an overlap between different electronic nameplates or between an electronic nameplate and a face may be calculated according to coordinates of these geometric centers, in other words, check whether the electronic nameplate blocks the face.

When received scenario decision information indicates that all electronic nameplates need to be displayed in a row, in this case, coordinates of B, B1, B2, . . . , and the like need to be adjusted, to ensure that a $y_b$ of a geometric center of each electronic nameplate is equal to a value of h.

In the method for determining the electronic nameplate position provided in this embodiment of this application, two-dimensional right-angle coordinates are used. In addition, similarly, the two-dimensional right-angle coordinates may be replaced with polar coordinates or column coordinates.

The method for determining the electronic nameplate position provided in this embodiment of this application provides a possible method for calculating an electronic nameplate position size using a face position. In a specific actual case, another similar algorithm or a similar design parameter may be used for implementation, for example, a neural network algorithm. It should be understood that an algorithm implemented using the other similar algorithm or the similar design parameter should be included in the protection scope of this application.

Figure 7:
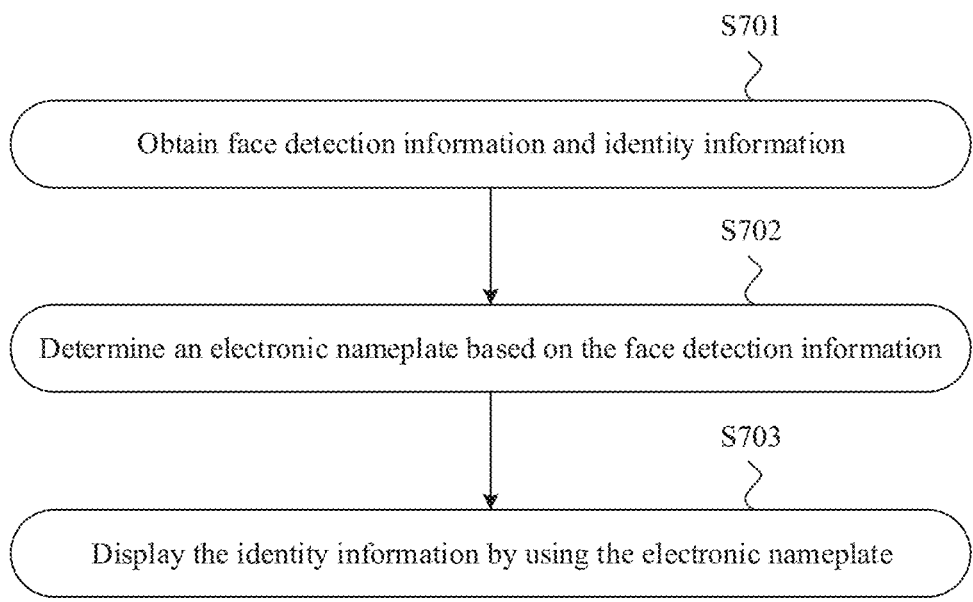
FIG. 7 shows an electronic nameplate display method in a video conference according to an embodiment of this application.

FIG. 7 shows an electronic nameplate display method in a video conference according to an embodiment of this application. As shown in FIG. 7, the method includes the following steps.

S701. Obtain face detection information and identity information.

The obtaining face detection information is performing face detection on a video image, at a conference site, collected by a camera, and the obtained face detection information includes a position of a face in the video image. Specifically, the position information may be presented using coordinates.

Specifically, the face detection may further detect a skin tone and a dress color of a participant.

Specifically, the obtaining identity information includes (1) performing face feature extraction on the video image, at the conference site, collected by the camera, to obtain the face feature information of the participant, (2) sending the face feature information to a server for matching and recognizing, where the server stores the face feature information of the participant, the identity information of the participant, and a correspondence between the face feature information and the identity information, and (3) receiving the identity information sent by the server.

S702. Determine an electronic nameplate based on the face detection information.

The determining an electronic nameplate based on the face detection information includes determining a position and a size of the electronic nameplate based on the position information in the face detection information. Specifically, coordinates of the electronic nameplate may be determined using coordinates of the face.

Optionally, the determining a position and a size of the electronic nameplate based on the position information in the face detection information includes determining a distribution status of the participant based on the position information in the face detection information, and determining the position and the size of the electronic nameplate based on the distribution status of the participant.

Further, the determining an electronic nameplate based on the face detection information may further include determining a display style of the electronic nameplate based on skin tone or dress color information of the participant in the face detection information, where the display style of the electronic nameplate includes brightness, color, contour form, transparency, and font and color of a character or a symbol in the electronic nameplate.

Before the step S702, a user instruction may further be obtained. The user instruction may be entered manually or using a voice. The user may be a participant or another person. The user instruction is used to indicate a display requirement of the user on the electronic nameplate. For example, a participant requires to reduce displaying transparency of the electronic nameplate. In this case, when it is determined, based on the face detection information, that the displaying transparency of the electronic nameplate further needs to be reduced according to the user instruction.

S703. Display the identity information using the electronic nameplate.

The identity information is added to the electronic nameplate for displaying.

After the electronic nameplate is displayed for the first time, the electronic nameplate may overlap a face or an electronic nameplate due to walking around of the participant. When it is detected that a position of an electronic nameplate overlaps a face area of the participant or another electronic nameplate, the position of the electronic nameplate is recalculated for displaying.

Specifically, the position of the electronic nameplate is recalculated for displaying by searching for an optimal position of the nameplate in a preset neighboring area of the face, where the preset neighboring area is determined based on coordinates, a width and a height of the face, and a width and a height of the nameplate. In the preset neighboring area, a distance s1 between a center point of a nameplate at a new position and a center point of the original nameplate, and a block overlapping area s2 between the nameplate at the new position and another nameplate or a face are calculated, weighted averaging is performed on s1 and s2, and a nameplate at the new position with a smallest weighted average value of s1 and s2 is determined as a nameplate at the optimal position in the neighboring area.

Further, the electronic nameplate may be connected to the face area of the participant corresponding to the electronic nameplate using a straight line or an arrow.

Optionally, after the electronic nameplate is displayed for the first time, detection is performed on a speech of the participant. When it is detected that speech duration of some participants is greater than first preset duration or less than second preset duration, electronic nameplates corresponding to some participants are replaced with a new electronic nameplate, where the replacing of the new electronic nameplate herein includes replacing a display style of an original electronic nameplate.

Optionally, after the electronic nameplate is displayed for the first time, detection is performed on a speech of the participant. When it is detected that speech duration of the other participants is less than third preset duration, electronic nameplates corresponding to the other participants are canceled for displaying in the video image.

According to the electronic nameplate display method in the video conference provided in this embodiment of this application, the position and the size of the electronic nameplate are calculated using a face position such that self-adaptive adjustment for displaying of the electronic nameplate of the participant can be implemented based on the face position in a different conference scenario, and the electronic nameplate can be displayed in a more intuitive manner. This improves conference efficiency.

Figure 8:
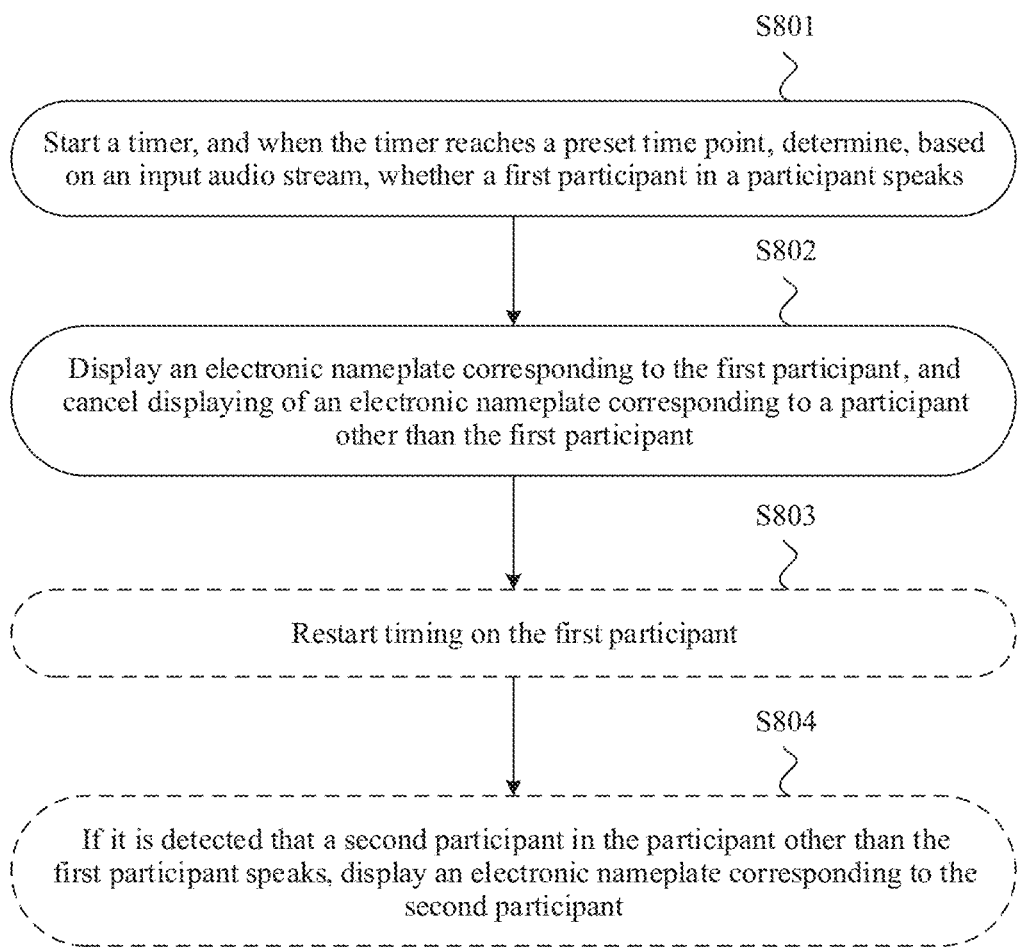
FIG. 8 shows an electronic nameplate timing display method in a video conference according to an embodiment of this application.

FIG. 8 shows an electronic nameplate timing display method in a video conference according to an embodiment of this application. As shown in FIG. 7, a sound source positioning detection technology needs to be used in the method. The method includes the following steps.

S801. Start a timer, and when the timer reaches a preset time point, determine, based on an input audio stream, whether a first participant in a participant speaks.

The input audio stream is an audio stream input in a time period from a time point when the timer starts timing to the preset time point.

S802. Display an electronic nameplate corresponding to the first participant, and cancel displaying of an electronic nameplate corresponding to another participant, where the other participant is a participant that is not the first participant in the participant.

S803. Restart timing on the first participant.

This step is optional. When it is detected that the first participant speaks and the electronic nameplate is displayed, timing is immediately restarted on the first participant. In this case, timing may not be performed on the other participant.

S804. When it is detected that a second participant in the other participants speaks, display an electronic nameplate corresponding to the second participant.

This step is optional. Once it is detected that the second participant in the other participants speaks, the electronic nameplate of the second participant is immediately displayed, and timing may be performed on the second participant again.

According to the electronic nameplate timing display method in the video conference provided in this embodiment of this application, displaying of the electronic nameplate of the participant is controlled by detecting whether the participant speaks and by performing timing on the speech duration of the participant. Canceling displaying of the electronic nameplate that is not required can reduce a waste of resources, and especially in a complex environment, can prevent the electronic nameplate from occupying too large video image.

Figure 9:
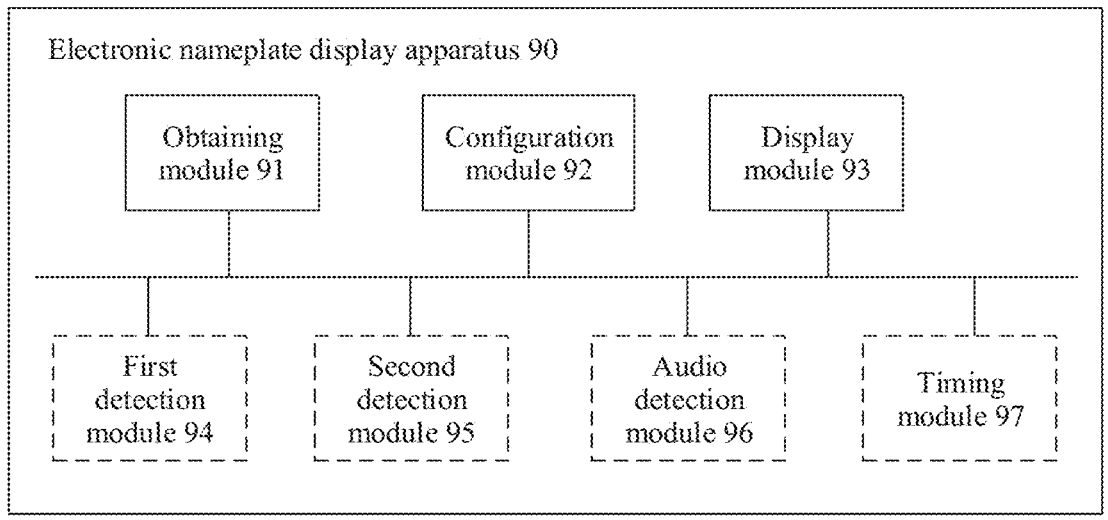
FIG. 9 is a schematic diagram of an electronic nameplate display apparatus in a video conference according to an embodiment of this application.

FIG. 9 is a schematic diagram of an electronic nameplate display apparatus 90 in a video conference according to an embodiment of this application. As shown in FIG. 9, the electronic nameplate display apparatus 90 includes an obtaining module 91, a configuration module 92, and a display module 93.

The obtaining module 91 is configured to obtain face detection information, where the face detection information includes a position of a participant in a video image.

The configuration module 92 is configured to determine electronic nameplate configuration information, where the electronic nameplate configuration information includes a display position and a size of an electronic nameplate in the video image, and the electronic nameplate configuration information is associated with the face detection information.

The display module 93 is configured to display the electronic nameplate in the video image based on the electronic nameplate configuration information.

Specifically, the electronic nameplate configuration information may further include one or more of the following information a color of the electronic nameplate, transparency of the electronic nameplate, a contour form of the electronic nameplate, a font of a character or a symbol in the electronic nameplate, and a color of a character or a symbol in the electronic nameplate.

Specifically, that the configuration module 92 determines electronic nameplate configuration information includes determining the display position and the size of the electronic nameplate in the video image based on the position of the face in the video image. Further, that the configuration module 92 determines electronic nameplate configuration information further includes detecting and determining a distribution status of the face in the video image based on position coordinates of the face in the video image, and determining the display position and the size of the electronic nameplate in the video image based on the distribution status.

Optionally, the obtaining module 91 is further configured to obtain a first input message, where the first input message is used to indicate a display requirement of a user on the electronic nameplate, the first input message includes manual input by the user and/or voice input by the user, and the first input message includes a display style of the electronic nameplate that the user expects.

Optionally, the face detection information further includes a skin tone and/or a dress color of the participant, and the color and/or the transparency of the electronic nameplate is determined based on the skin tone and/or the dress color of the participant.

In a possible design, the electronic nameplate display apparatus 90 further includes a first detection module 94, and the first detection module 94 is configured to detect whether a position of the electronic nameplate overlaps a face area of the participant or another electronic nameplate.

When the first detection module 94 detects that the position of the electronic nameplate overlaps the face area of the participant or the other electronic nameplate, the display module 93 displays the electronic nameplate or the other electronic nameplate at a new position in the video image.

In a possible design, the electronic nameplate display apparatus 90 further includes a second detection module 95, and the second detection module 95 is configured to detect whether speech duration of a participant in the participant is greater than first preset duration or less than second preset duration.

When the second detection module 95 detects that speech duration of a first participant in the participant is greater than the first preset duration or less than the second preset duration, the display module 93 replaces an electronic nameplate corresponding to the first participant with a new electronic nameplate.

Optionally, when the second detection module 95 detects that speech duration of a second participant in the participant is less than the second preset duration, the display module 93 may further cancel displaying of an electronic nameplate corresponding to the second participant in the video image.

In an optional solution, the electronic nameplate display apparatus 90 further includes an audio detection module 96 and a timing module 97, where the timing module 97 is configured to perform timing on the participant, the audio detection module 96 is configured to, when timing of the timing module 97 reaches a preset time point, detect at least one third participant corresponding to an input audio stream, and the display module 93 is further configured to determine whether an electronic nameplate corresponding to the at least one third participant is in a display state, and when the electronic nameplate corresponding to the at least one third participant is not in the display state, the display module 93 displays the electronic nameplate corresponding to the at least one third participant.

Further, the display module 93 is further configured to cancel displaying of an electronic nameplate corresponding to another participant, where the other participant is a participant that is not the third participant.

Optionally, the timing module 97 is further configured to perform timing on the at least one third participant again.

Further, the audio detecting module 96 is further configured to detect whether a fourth participant in the other participants speaks.

When the audio detection module 96 detects that the fourth participant in the other participants speaks, the display module 93 displays an electronic nameplate corresponding to the fourth participant.

The timing module 97 is further configured to perform timing on the fourth participant.

Optionally, the obtaining module 91 is further configured to obtain a second input message, where the second input message is used to indicate canceling displaying of at least one specified electronic nameplate or indicate to replace at least one specified electronic nameplate with at least one new electronic nameplate, and the second input message includes manual input by the user and/or voice input by the user.

Figure 10:
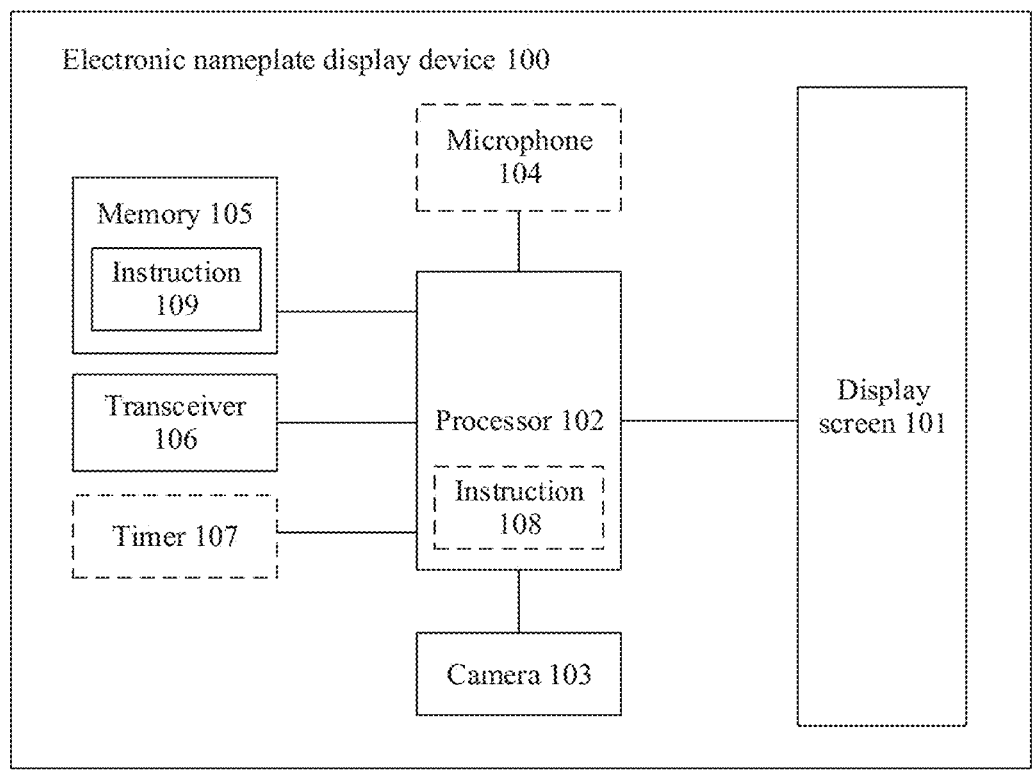
FIG. 10 is a schematic diagram of an electronic nameplate display device in a video conference according to an embodiment of this application.

FIG. 10 is a schematic diagram of an electronic nameplate display device 100 in a video conference according to an embodiment of this application. The electronic nameplate display device 100 includes a display screen 101, one or more processors 102, a camera 103, a microphone 104, a memory 105, and a transceiver 106. The processor 102 may also be referred to as a processing unit, and may implement a specific control function. The processor 102 may be a general-purpose processor, a dedicated processor, or the like, for example, may be a baseband processor or a central processing unit. The baseband processor may be configured to process a communications protocol and communications data. The central processing unit may be configured to control the communications apparatus (for example, a base station, a baseband chip, a distribute unit (DU), or a central unit (CU)), execute a software program, and process data of the software program. The transceiver 103 may be referred to as a transceiver unit, a transceiver, a transceiver circuit, a transceiver, or the like, and is configured to implement a transceiver function of the communications apparatus.

The electronic nameplate display device 100 in the video conference includes a memory 105 configured to store a program instruction 109, a camera 103 configured to obtain a video image of a participant, a transceiver 106 configured to obtain identity information of the participant, a processor 102 configured to run the program instruction 109 to execute obtaining a position of a face of the participant in the video image and determining a display position and a size of an electronic nameplate in the video image based on the position of the face in the video image, and a display screen 101 configured to display the identity information of the participant using the electronic nameplate.

Specifically, that the processor 102 determines a display position and a size of an electronic nameplate in the video image based on a position of a face in the video image includes determining, by the processor 102, a distribution status of the face based on the position of the face in the video image, and determining, by the processor 102, the display position and the size of the electronic nameplate in the video image based on the position of the face in the video image and the distribution status of the face.

The processor 102 may further be configured to configure a color of the electronic nameplate, transparency of the electronic nameplate, a contour form of the electronic nameplate, a font of a character or a symbol in the electronic nameplate, and a color of a character or a symbol in the electronic nameplate.

Optionally, the transceiver 106 is further configured to receive an input message, where the input message is used to indicate a display requirement of a user on the electronic nameplate, and the input message includes manual input by the user and/or voice input by the user.

The processor 102 is further configured to obtain a skin tone and/or a dress color of the participant in the video image, and determine the color and/or the transparency of the electronic nameplate based on the skin tone and/or the dress color of the participant.

The processor 102 is further configured to determine whether the electronic nameplate overlaps a face area of the participant or another electronic nameplate. when the processor 102 determines that the electronic nameplate overlaps the face area of the participant or the other electronic nameplate, the processor 102 determines a new display position or a new size of the electronic nameplate or the other electronic nameplate, and the display screen 101 displays the electronic nameplate or the other electronic nameplate at the new position and in the new size.

In an optional solution, the electronic nameplate display device 100 may further include a timer 107 and a microphone 104, where the timer 107 is configured to perform timing on the participant, the microphone 104 is configured to collect an audio stream input within a preset time period, the processor 102 is further configured to determine at least one first participant in the participant corresponding to the input audio stream, and the display screen 101 is further configured to determine whether an electronic nameplate corresponding to the first participant is in a display state, and when the electronic nameplate corresponding to the first participant is not in the display state, the display screen 101 displays the electronic nameplate corresponding to the first participant.

Optionally, the timer 107 is further configured to perform timing on speech duration of the participant. The processor 102 determines whether speech duration of a participant in the participant is greater than first preset duration or less than second preset duration. when the processor 102 determines that speech duration of a second participant in the participant is greater than the first preset duration or less than the second preset duration, the processor 102 determines a new electronic nameplate corresponding to the second participant, and the display screen 101 replaces an electronic nameplate corresponding to the second participant with the new electronic nameplate for displaying.

Optionally, when the processor 102 determines that the speech duration of the second participant is less than the second preset duration, the display screen 101 may further cancel displaying of the electronic nameplate corresponding to the second participant.

In a possible design, the processor 102 may alternatively store an instruction 108, and the instruction 108 may be run by the processor 102 such that the electronic nameplate display device 100 performs the method performed by the processor 102.

In still another possible design, the electronic nameplate display device 100 includes a circuit, and the circuit may perform the method of the processor 102, the transceiver 106, or the timer 107.

Optionally, the electronic nameplate display device 100 may include one or more memories 105, and the memory 105 may further store other related data or intermediate data. Optionally, the processor 102 may alternatively store an instruction and/or data. The processor 102 and the memory 105 may be disposed separately, or may be integrated together.

This application further provides a readable storage medium. The readable storage medium stores an execution instruction. When at least one processor of the electronic nameplate display device 100 executes the execution instruction, the electronic nameplate display device 100 performs the method performed by the processor 102 in the device embodiment corresponding to FIG. 10.

This application further provides a program product. The program product includes an execution instruction, and the execution instruction is stored in a readable storage medium. At least one processor of the electronic nameplate display device 100 may read the execution instruction from the readable storage medium, and the at least one processor executes the execution instruction such that the electronic nameplate display device 100 implements the method performed by the processor 102 in the device embodiment corresponding to FIG. 10.

For same or similar parts in the embodiments in this specification, refer to the embodiments. Especially, a device embodiment is basically similar to a method embodiment, and therefore is described briefly. For related parts, refer to partial descriptions in the method embodiment.

Apparently, a person skilled in the art should understand that the foregoing modules or steps in the present disclosure may be implemented using a general-purpose computing apparatus, and the modules or steps may be centralized on a single computing apparatus, or distributed on a network including a plurality of computing apparatuses. Optionally, the modules or steps may be implemented using program code that can be executed by the computing apparatus such that the modules or steps may be stored in a storage medium (read-only memory (ROM)/random-access memory (RAM), magnetic disk, or optical disc) and executed by the computing apparatus. In some cases, the steps shown or described may be performed in a sequence different from that described herein. Alternatively, all or part of the modules or steps are fabricated into various integrated circuit modules, or into a single integrated circuit module for implementation. In this way, a combination of any specific hardware and software is not limited in the present disclosure.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An electronic nameplate display method in a video conference, comprising:
    obtaining a position of a face of a first participant in a video image;
    obtaining identity information of the first participant;
    determining, based on the position of the face, a display position for a first electronic nameplate that includes the identity information and that corresponds to the first participant in the video image;
    displaying the first electronic nameplate at the display position; and
    one or more of:
        replacing the first electronic nameplate with a second electronic nameplate corresponding to the first participant in response to a change of a speech state of the first participant, wherein the change of the speech state comprises the speech state changes from a non-speaking state to a speaking state or the speech state changes from the speaking state to the non-speaking state; or
        determining that the speech state of the first participant changes from the non-speaking state to the speaking state; determining, in response to determining that the speech state of the first participant changes from the non-speaking state to the speaking state, whether the first electronic nameplate is in a display state; and displaying, in response to determining that the first electronic nameplate is not in the display state, the first electronic nameplate.

2. The electronic nameplate display method of claim 1, further comprising:
   determining a distribution status of the face based on the position; and
   determining the display position and a size of the first electronic nameplate based on the distribution status.

3. The electronic nameplate display method of claim 1, further comprising configuring at least one of a color of the first electronic nameplate, a transparency of the first electronic nameplate, a contour form of the first electronic nameplate, a font of a character, a symbol in the first electronic nameplate, a color of a character, or a symbol in the first electronic nameplate.

4. The electronic nameplate display method of claim 3, further comprising:
   obtaining a skin tone or a dress color of the first participant; and
   configuring the color or the transparency based on the skin tone or the dress color.

5. The electronic nameplate display method of claim 1, further comprising obtaining an input message, wherein the input message indicates a display requirement of a user on the first electronic nameplate, and wherein the input message comprises a manual input by the user or a voice input by the user.

6. The electronic nameplate display method of claim 1, wherein after displaying the identity information using the first electronic nameplate, the electronic nameplate display method further comprises further displaying the first electronic nameplate, or another electronic nameplate at a new position in response to the first electronic nameplate overlapping either a face area of the first participant or the other electronic nameplate.

7. The electronic nameplate display method of claim 1, further comprising connecting the first electronic nameplate to a face area of the first participant using a straight line or an arrow.

8. The electronic nameplate display method of claim 1, further comprising when the first participant speaks for more than a preset duration, determining that the speech state of the first participant is the speaking state.

9. The electronic nameplate display method of claim 1, further comprising when the first participant does not speak for more than a preset duration, determining that the speech state of the first participant is the non-speaking state.

10. The electronic nameplate display method of claim 1, wherein the identity information comprises at least one of a name, an age, contact information, a place of origin, a working company, a position, or an educational background.

11. An electronic nameplate display device in a video conference, wherein the electronic nameplate display device comprises:
   a processor; and
   a memory coupled to the processor and configured to store instructions that, when executed by the processor, cause the electronic nameplate display device to be configured to:
      obtain a position of a face of a first participant in the video image;
      obtain identity information of the first participant;
      determine, based on the position of the face, a display position for a first electronic nameplate that includes the identity information and that corresponds to the first participant in the video image;
      display the first electronic nameplate at the display position; and
      one or more of:
         replace the first electronic nameplate with a second electronic nameplate in response to a change of a speech state of the first participant, wherein the change of the speech state comprises the speech state changes from a non-speaking state to a speaking state or the speech state changes from the speaking state to the non-speaking state; or
         determine that the speech state of the first participant changes from the non-speaking state to the speaking state; determine, in response to determining that the speech state of the first participant changes from the non-speaking state to the speaking state, whether the first electronic nameplate is in a display state; and display, in response to determining that the first electronic nameplate is not in the display state, the first electronic nameplate.

12. The electronic nameplate display device of claim 11, wherein the instructions further cause the electronic nameplate display device to be configured to:
   determine a distribution status of the face based on the position of the face in the video image; and
   determine the display position and a size of the first electronic nameplate in the video image based on the position of the face in the video image and the distribution status of the face.

13. The electronic nameplate display device of claim 11, wherein the instructions further cause the electronic nameplate display device to be configured to configure at least one of a color of the first electronic nameplate, a transparency of the first electronic nameplate, a contour form of the first electronic nameplate, a font of a character, a symbol in the first electronic nameplate, a color of a character, or a symbol in the first electronic nameplate.

14. The electronic nameplate display device of claim 13, wherein the instructions further cause the electronic nameplate display device to be configured to:
   obtain a skin tone or a dress color of the first participant in the video image; and
   determine the color or the transparency of the first electronic nameplate based on the skin tone or the dress color of the first participant.

15. The electronic nameplate display device of claim 11, wherein the instructions are further configured to cause the electronic nameplate display device to be configured to receive an input message that indicates a display requirement of a user on the first electronic nameplate, wherein the input message comprises manual input by the user or voice input by the user.

16. The electronic nameplate display device of claim 11, wherein the instructions further cause the electronic nameplate display device to be configured to:
   determine whether the first electronic nameplate overlaps a face area of the first participant or another electronic nameplate; and
   determine a new display position and a new size of the first electronic nameplate or the other electronic nameplate when the first electronic nameplate overlaps the face area of the first participant or the other electronic nameplate.

17. The electronic nameplate display device of claim 11, wherein the instructions further cause the electronic nameplate display device to be configured to:
   perform timing on a speech duration of the first participant;
   determine whether the speech duration of the first participant is greater than a first preset duration or less than a second preset duration; and determine a third electronic nameplate corresponding to a second participant when a speech duration of the second participant is greater than the first preset duration or less than the second preset duration; and replace a third electronic nameplate corresponding to the second participant with the third electronic nameplate.

18. The electronic nameplate display device of claim 17, wherein the instructions further cause the electronic nameplate display device to be configured to not display the third electronic nameplate when the speech duration of the second participant is less than the second preset duration.

19. A non-transitory computer readable medium comprising instructions that, when executed by a processor, cause an electronic nameplate display device to:

obtain a position of a face of a first participant in a video image;

obtain identity information of the first participant;

determine, based on the position of the face, a display position for a first electronic nameplate that includes the identity information and that corresponds to the first participant in the video image;

display the first electronic nameplate at the display position; and one or more of:

replace the first electronic nameplate with a second electronic nameplate in response to a change of a speech state of the first participant, wherein the change of the speech state comprises the speech state changes from a non-speaking state to a speaking state or the speech state changes from the speaking state to the non-speaking state; or determine that the speech state of the first participant changes from the non-speaking state to the speaking state; determine, in response to determining that the speech state of the first participant changes from the non-speaking state to the speaking state, whether the first electronic nameplate is in a display state; and display, in response to determining that the first electronic nameplate is not in the display state, the first electronic nameplate.

* * * * *